United States Patent [19]

Gellert

[11] Patent Number: 5,536,165
[45] Date of Patent: Jul. 16, 1996

[54] INJECTION MOLDING APPARATUS WITH NOZZLE ADVANCEABLE TO MOUNT SIDE GATE SEALS

[76] Inventor: Jobst U. Gellert, 7A Prince Street, Georgetown, Ontario, Canada, L7G 2X1

[21] Appl. No.: 464,286

[22] Filed: Jun. 5, 1995

[51] Int. Cl.$^6$ ................................................ B29C 45/20
[52] U.S. Cl. ..................... 425/549; 264/328.15; 425/572
[58] Field of Search .................................... 425/549, 572; 264/328.15

[56] References Cited

U.S. PATENT DOCUMENTS 5,324,191   6/1994   Schmidt ..................................... 425/549

Primary Examiner—Tim Heitbrink
Attorney, Agent, or Firm—Dalesman & Company

[57] ABSTRACT

Injection molding apparatus having several side gate seals extending radially from a heated nozzle. The nozzle has a locating flange portion which is received in an opening in the mold. This laterally locates the nozzle while allowing it to be advanced for mounting of the side gate seals and then retracted to an assembled position where it is longitudinally located by the side gate seals being received in the mold. Thus, the nozzle is longitudinally located in the same plane as the gates and in one embodiment a melt distribution manifold is free to float with the rear ends of the nozzles. This also provides for differences in the thermal expansion due to possible different operating temperatures.

3 Claims, 4 Drawing Sheets

INJECTION MOLDING APPARATUS WITH NOZZLE ADVANCEABLE TO MOUNT SIDE GATE SEALS

BACKGROUND OF THE INVENTION

This invention relates generally to injection molding and more particularly to side gating apparatus having at least one heated nozzle which is first located laterally to allow the nozzle to be advanced for mounting of side gate seals and then located longitudinally by the side gate seals in a retracted assembled position.

As seen in U.S. Pat. No. 4,981,431 to Schmidt which issued Jan. 1, 1991, edge gating through a number of edge gate seals extending radially outwardly from a heated nozzle seated in an opening in a mold is well known. In this previous arrangement, the nozzle is located longitudinally by an insulation flange sitting on a circumferential shoulder in the mold. This was satisfactory as the cavities were located very close to the nozzles so the edge gate seals did not extend outwardly past the inner surface of the opening in the mold. This allowed the edge gate seals to be mounted on the nozzle prior to the nozzle being inserted into the opening in the mold. This is not satisfactory in applications where more space is required such as for cooling conduits extending between the heated nozzle and the surrounding cavities. In this case, longer side gate seals are required which do not fit through the opening in the mold and thus must be mounted on the nozzle after the nozzle has been inserted through the opening. The previous longitudinal location of the nozzle by the insulation flange also has the disadvantage that the longitudinal location is some distance removed from the common plane through the gates. This causes difficulty in accurate alignment of the edge gate seals with the gates due to thermal expansion and contraction. If the edge gate seals are not accurately aligned with the gates at the operating temperature, unsatisfactory reliability and quality control results.

Furthermore, in this previous arrangement the nozzle is located laterally by an outer face of each gate seal abutting against the inner surface of the opening in the mold. This has the disadvantage that the components must be manufactured to extremely close tolerances in order to provide contact at all of the edge gate seals around the nozzle and it is difficult to allow for differences in lateral thermal expansion due to different operating temperatures for different applications.

SUMMARY OF THE INVENTION

Accordingly, it is an object of the present invention to at least partially overcome the disadvantages of the prior art by providing side gating injection molding apparatus wherein lateral location of a heated nozzle allows the nozzle to be advanced for mounting of several side gate seals and then retracted to an assembled position in which longitudinal location of the nozzle is provided by the side gate seals.

To this end, in one of its aspects, the invention provides side gated injection molding apparatus having at least one heated nozzle located in a mold, the at least one heated nozzle having a rear end, a front portion with a front end and a generally cylindrical outer surface extending through a central opening in the mold, the central opening in the mold having a generally cylindrical inner surface with an insulative air space provided between the outer surface of the front portion of the at least one heated nozzle and the inner surface of the central opening in the mold, the at least one heated nozzle having a melt channel extending therethrough to convey melt to fill a plurality of cavities spaced in the mold around the central opening, the melt channel having a central portion extending from the rear end of the at least one heated nozzle and a plurality of radial portions branching outwardly from the central portion adjacent the front end of the front portion of the at least one heated nozzle, each radial portion of the melt channel extending in a common plane in alignment with a respective gate extending in the mold to one of the cavities, a plurality of spaced side gate seals, each having an inner end, an outer end, and a bore therebetween, the inner end being seated in the front portion of the at least one heated nozzle with the side gate seal extending radially outwardly across the insulative air space in alignment between a respective radial portion of the melt channel and a respective gate to convey melt outwardly from the melt passage to the gate to fill the cavity, having the improvement wherein the at least one heated nozzle is initially located laterally by a cylindrical locating flange portion of the at least one nozzle fitting in the central opening in the mold which allows the at least one nozzle to be advanced to a forward mounting position in which the front portion of the at least one nozzle projects forwardly from the central opening sufficiently to facilitate mounting of the side gate seals in the front portion of the at least one nozzle and then retracted to an assembled position in which the side gate seals are aligned with respective gates in the mold, and the at least one heated nozzle is then located longitudinally in the assembled position by each side gate seal having an outer end seated in a matching radial opening in the mold leading to a respective gate, whereby the at least one nozzle is located longitudinally at said common plane extending through said gates while allowing for sufficient longitudinal movement of the locating flange portion to provide for thermal expansion and contraction of the at least one nozzle.

Further objects and advantages of the invention will appear from the following description taken together with the accompanying drawings.

DETAILED DESCRIPTION OF THE INVENTION

Figure 1:
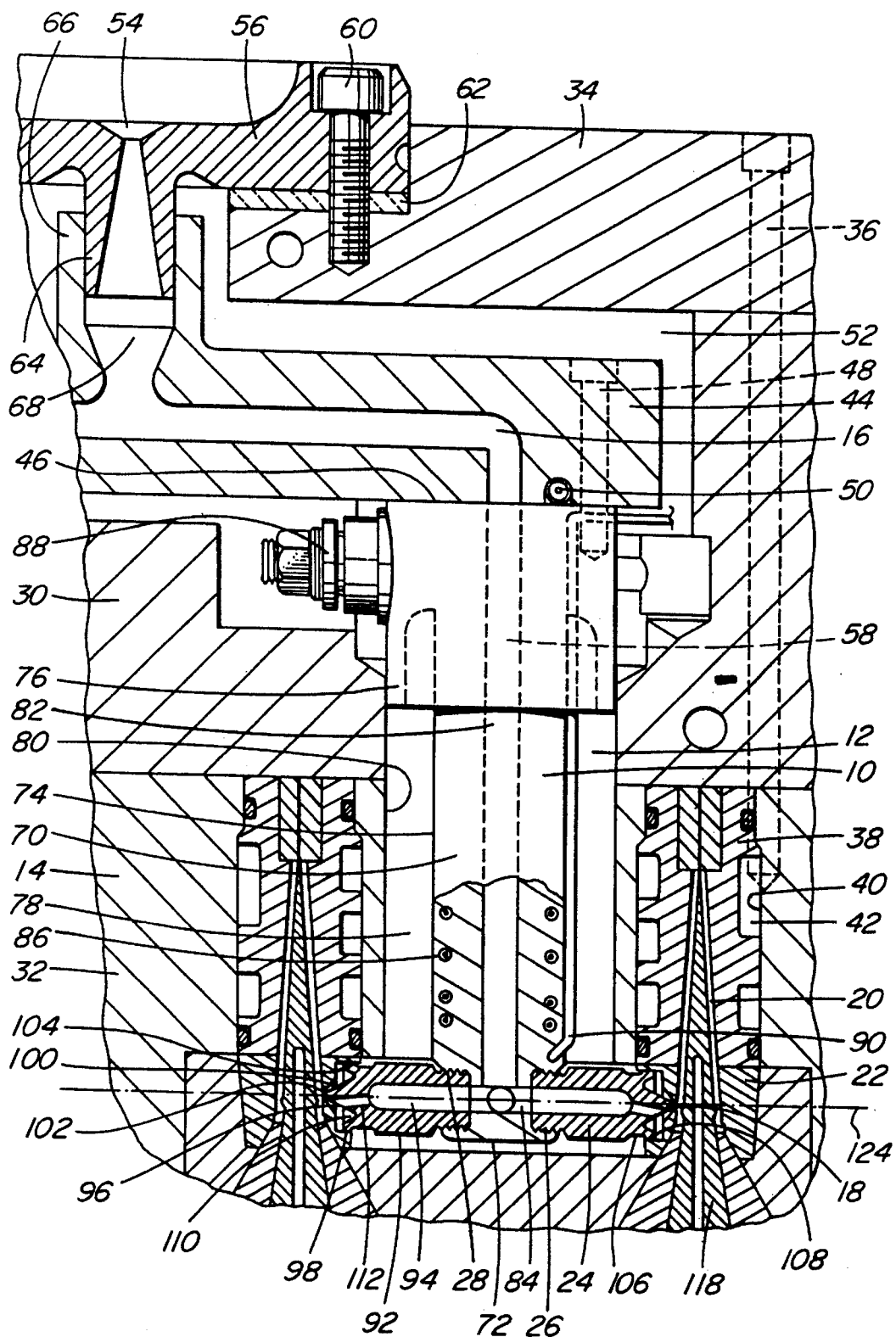
FIG. 1 is a sectional view of a portion of a side gated multi-nozzle injection molding system according to one embodiment of the invention.

Reference is first made to FIG. 1 which shows a portion of a multi-cavity side gated injection molding system or apparatus in which several steel nozzles 10 are mounted in cylindrical openings 12 in a mold 14 to convey pressurized melt through a melt passage 16 to gates 18 leading to cavities 20 in the mold. In this embodiment, several elongated cavities 20 are spaced around each nozzle 10 and each gate 18 extends through a gate insert 22 seated in the mold 14. Each gate 18 is aligned with a side gate seal 24 having a threaded inner end 26 which is screwed into a threaded seat 28 in the nozzle 10.

While molds have a wide variety of configurations, in this case a spacer plate 30 is mounted between a cavity plate 32 and a back plate 34 which are secured together by screws 36 in a conventional manner. The spacer plate 30 and cavity plate 32 are precisely aligned by dowel pins (not shown). In this arrangement, each elongated cavity 20 extends partially in the gate insert 22 and partially in a cavity insert 38 against which the gate insert 22 is securely mounted. A number of the cavity inserts 38 are spaced around each nozzle 10 in bores 40 in the cavity plate 32. Cooling water is pumped through cooling conduits 42 extending around each cavity insert 38 to provide cooling between the heated nozzle 10 and the cavities 20.

The nozzles 10 are interconnected by a steel melt distribution manifold 44 which extends between the spacer plate 30 and the back plate 34 and is secured against the rear ends 46 of the nozzles 10 by screws 48. The melt distribution manifold 44 is heated by an integral electrical heating element 50 and an insulative air space 52 is provided between it and the surrounding cooled spacer plate 30 and back plate 34. The melt passage 16 receives melt from a molding machine (not shown) through a central inlet 54 in a locating ring 56 seated in the back plate 34 and branches out in the manifold 44 to pass through a melt channel 58 which extends longitudinally in each of the nozzles 10. The locating ring 56 is secured in place by screws 60 which extend through an insulation ring 62 formed of a suitable glass-epoxy material into the back plate 34. In this embodiment, the locating ring 56 has a sprue stem 64 projecting into a cylindrical inlet portion 66 of the heated manifold 44. This provides a slidable connection to convey melt from the fixed locating ring 56 to an inlet portion 68 of the melt passage 16 in the cylindrical inlet portion 66 of the heated manifold which is movable to allow for movement of the manifold 44 and the screw mounted nozzle 10 during installation and to provide for thermal expansion and contraction, as described in more detail below. In other embodiments, this slidable connection can be provided in a variety of ways and can convey the melt directly from a molding machine to the movable manifold 44.

Each nozzle has a front portion 70 with a front end 72 and general cylindrical outer surface 74. The nozzle has a cylindrical locating flange portion 76 which fits in the cylindrical opening 12 in the spacer plate 30 to laterally locate the nozzle according to the invention. This lateral location of each nozzle 10 allows the nozzles 10 and the attached manifold 44 to initially be advanced to a forward mounting position in which the front portion 70 of each nozzle 10 projects forwardly from the opening 12 in the mold 14 sufficiently to allow the side gate seals 24 to be easily screwed into the threaded seats 28 in the front portion 70 of the nozzle 10. This also allows sufficient longitudinal movement of the locating flange portion 76 to provide for thermal expansion and contraction of the nozzle 10 as described below. Thus, the front portion 70 of the nozzle 10 is located centrally between the cavities 20 and an insulative air space 78 is provided between the outer surface 74 of the front portion 70 of the nozzle 10 and the surrounding cylindrical inner surface 80 of the central opening 12. The melt channel 58 in the nozzle 10 has a central portion 82 extending from the rear end 46 to a number of radial portions 84 which branch outwardly adjacent the front end 72 of the front portion 70 of the nozzle 10. The radial portion 84 extended in a common plane 124, and each of them is in alignment with one of the gates 18. The nozzle 10 is heated by an integral electrical heating element 86 which extends around the central portion 82 of the melt channel 58 and has an external terminal 88. A thermocouple element 90 extends into the nozzle 10 near the front end 72 to monitor the operating temperature.

As mentioned above, when the nozzle 10 is initially advanced to the forward mounting position, each side gate seal 24 is screwed into the threaded seat 28 in the front portion 70 of the nozzle 10 where it extends outwardly across the insulative air space 78 around the nozzle 10. The side gate seal 24 has a hexagonal central portion 92 to be engaged by a wrench to tighten it into place. The side gate seal 24 has a melt bore 94 which is aligned to receive melt from one of the radial portions 84 of the melt channel 58 in the nozzle 10. The side gate seal 24 has an outer end 96 with a cylindrical sealing rim 98 extending around a conical central portion 100 with a pointed tip 102. Each gate insert 22 which forms part of the mold 14 has a radial opening 104 leading to a respective gate 18 in which the outer end 96 of the respective side gate seal 24 is received. The radial opening 104 has an outer cylindrical portion 106 extending concentrically with the gate 18. Each side gate seal 24 is mounted with its outer end 96 received in one of the radial openings 104 in the gate insert 22 with the cylindrical sealing rim 98 of the side gate seal 24 fitting in the cylindrical portion 106 of the radial opening 104. While there is sealing contact between the cylindrical sealing rim 98 and the surrounding cylindrical portion 106 of the radial opening 100, there is no contact between the outer face 108 of the cylindrical sealing rim 98 and the gate insert 22. Thus, the side gate seals 24 locate the nozzle 10 longitudinally with the pointed tip 102 of each side gate seal 24 accurately aligned with a respective gate 18, but the cylindrical sealing rim 98 of each side gate seal 24 is free to slide slightly inwardly and outwardly in the surrounding cylindrical portion 106 of the respective radial opening 104 to allow for thermal expansion of the nozzle 10 and the side gate seals 24. The sealing contact between the cylindrical sealing rim 98 and the surrounding cylindrical portion 106 of the radial opening 104 also forms a sealed circular space 110 in the radial opening 104 in the gate insert 22 around the conical central portion 100 of the outer end 96 of the side gate seal 24. In this embodiment, the melt bore 94 through the side gate seal 24 has a diagonal portion 112 which extends outwardly to convey melt into the sealed circular space 110. The melt then flows from the sealed circular space 110 outwardly around the pointed tip 102 of the side gate seal 24 and through the aligned gate 18 of the cavity 20. In other embodiments, the melt bore 94 through the side gate seal 24 can extend directly outwardly through a tapered nozzle portion in alignment with the gate 18. In this embodiment, the outer end 96 of each side gate seal 24 extends outwardly past the inner surface 80 of the central opening 12 in the mold 14 a sufficient distance to provide room for the cooling conduits 42 extending between the nozzle 10 and the cavities 20.

Figure 2:
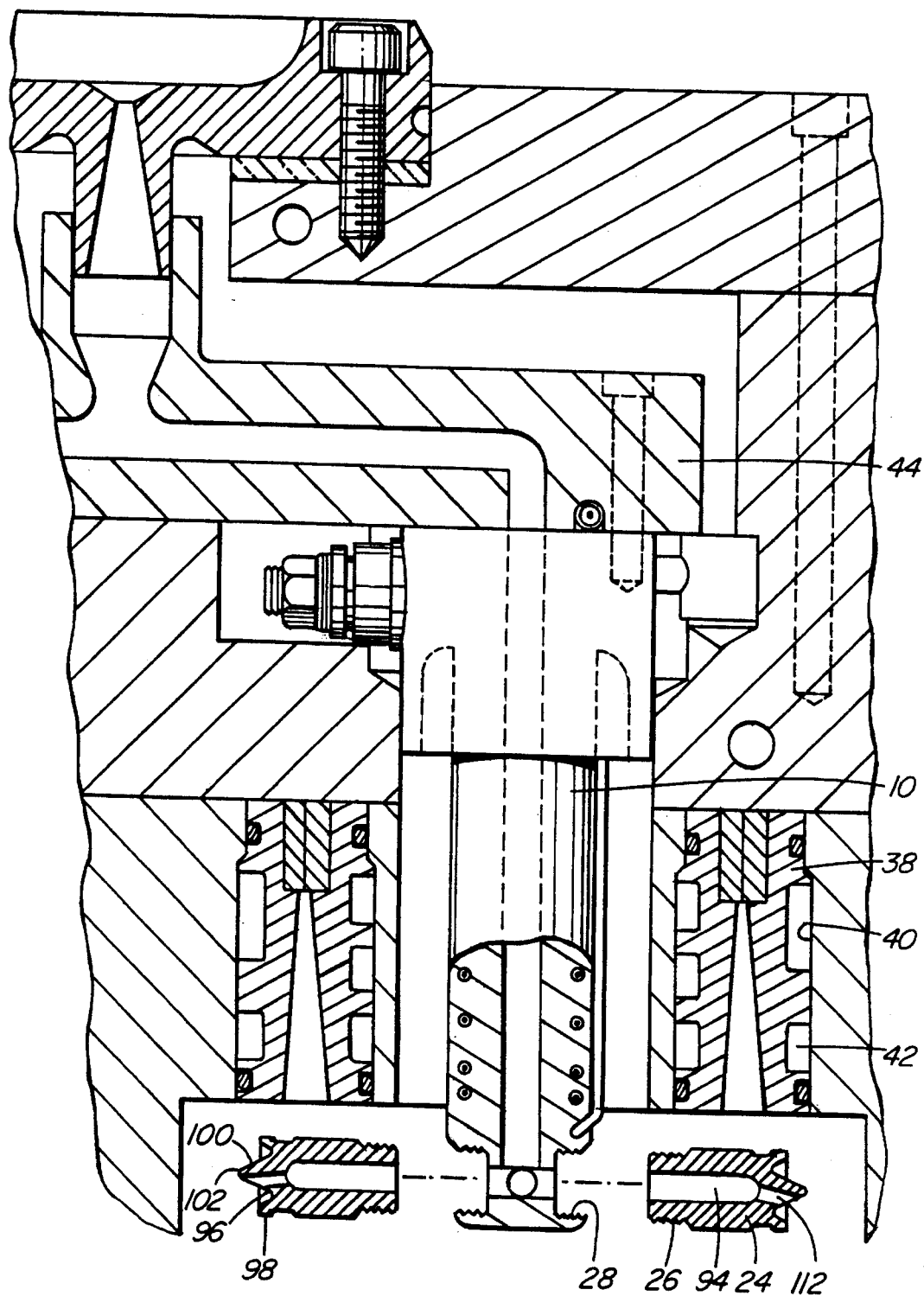
FIG. 2 is a similar view of the same embodiment showing the nozzle in the forward mounting position and the side gate seals in position for mounting.
Figure 3:
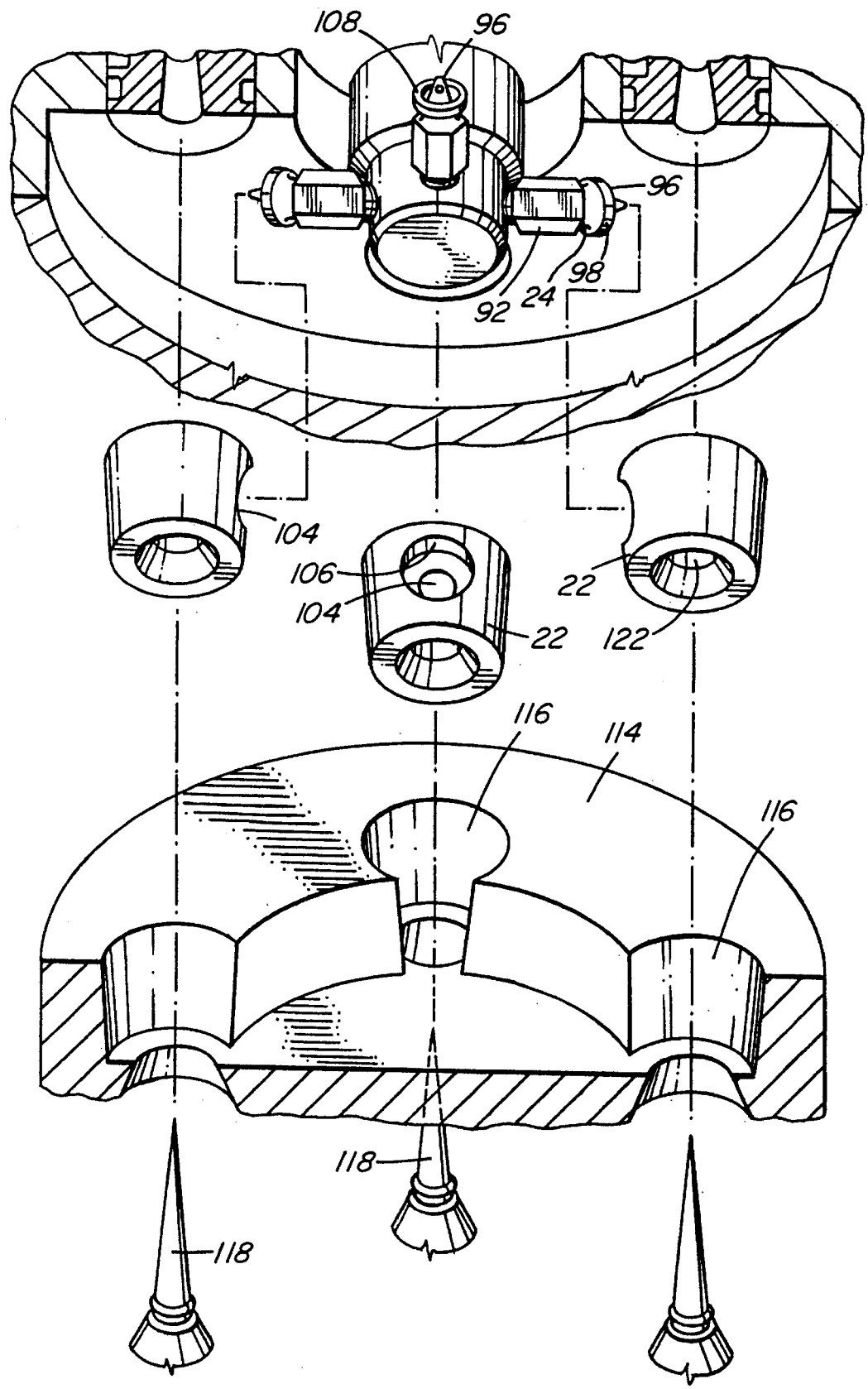
FIG. 3 is an isometric view of the same apparatus showing how assembly is completed.

During assembly, in this embodiment the nozzles 10 are each attached to the manifold 44 by the screws 48. Each nozzle 10 is mounted with its front portion 70 projecting through the opening 12 in the mold 14. As seen in FIG. 2, the nozzles 10 and attached manifold 44 are advanced forwardly to provide room for the side gate seals 24 to be easily screwed into place in the threaded seats 28. The manifold 44 and attached nozzles 10 are then retracted to the position shown in FIG. 1 and a gate insert 22 is mounted in place on each side gate seal 24 to form part of the mold 14 by inserting it upwardly and then sliding it radially inward over the outer end 96 of the side gate seal 24. A gate insert retainer plate 114 is then secured in place by screws (not shown). As seen in FIG. 3, the gate insert retainer plate 114 has recesses 116 therein in which the gate inserts 22 are received to hold them in place. The gate inserts 22 have the radial openings 104 in which the side gate seals 24 are received to in turn locate the nozzle 10 longitudinally in the retracted assembled position. The recesses 116 in the gate insert retainer plate 114 and the inserts 22 are tapered to provide for easy assembly and ensure a tight fit. Finally, the cavity cores 118 with central cooling conduits 120 are secured in place extending through a hole 122 in each gate insert 22 into the adjacent cavity insert 38. Of course, the nozzle 10 and side gate seals 24 are removable for cleaning or replacement by reversing this procedure. In other embodiments, the gate 18 and the radial openings 104 in the mold 14 can be formed directly between the cavity inserts 38 and the retainer plate 114 without using the gate inserts 22 to locate the nozzle 10.

In use, after installation in the mold 14 as seen in FIG. 1 and described above, electrical power is applied to the heating element 50 in the manifold 44 and to the heating elements 86 in the nozzles 10 to heat them to a predetermined operating temperature. As described above, the nozzles 10 are located longitudinally by the circumferential sealing rims 98 of the side gate seals 24 being seated in the radial openings 100 in the gate inserts 22. When the system is heated up, thermal expansion of the nozzles 10 causes the floating manifold 44 to move slightly rearwardly. This movement is accommodated by the sprue stem 64 of the locating ring 56 sliding inside the heated cylindrical inlet portion 66 of the manifold 44 and by the locating flange portion 76 of each nozzle 10 sliding in the central opening 12 in the spacer plate 30. Thus, the nozzle 10 is longitudinally located by the side gate seals 24 along the plane 124 through the gates 18. This ensures that the side gate seals 24 remain accurately aligned with the gates 18 regardless of the amount of thermal expansion due to the particular operating temperature. Differences in longitudinal thermal expansion are accommodated by the rear ends 46 of the nozzle 10 and the attached manifold 44 being free to float to different longitudinal positions. Similarly, differences in lateral thermal expansion are accommodated by the nozzle 10 being lateral located by the locating flange portion 76 while the cylindrical sealing rim 98 of each side gate seal 24 is free to slide slightly inwardly and outwardly in the surrounding cylindrical portion 106 of the radial opening 104 in the gate inserts 22. Pressurized melt is applied from a molding machine (not shown) to the central inlet 54 of the melt passage 16 according to a predetermined cycle. The melt flows through the melt distribution manifold 44, nozzles 10, side gate seals 24, and gates 18 into the cavities 20. After the cavities 20 are filled and a suitable packing and cooling period has expired, the injection pressure is released and the melt conveying system is decompressed to avoid stringing through the open gates 18. The mold 14 is then opened to eject the molded products. After ejection, the mold 14 is closed and the cycle is repeated continuously with a cycle time dependent upon the size of the cavities 20 and the type of material being molded.

Figure 4:
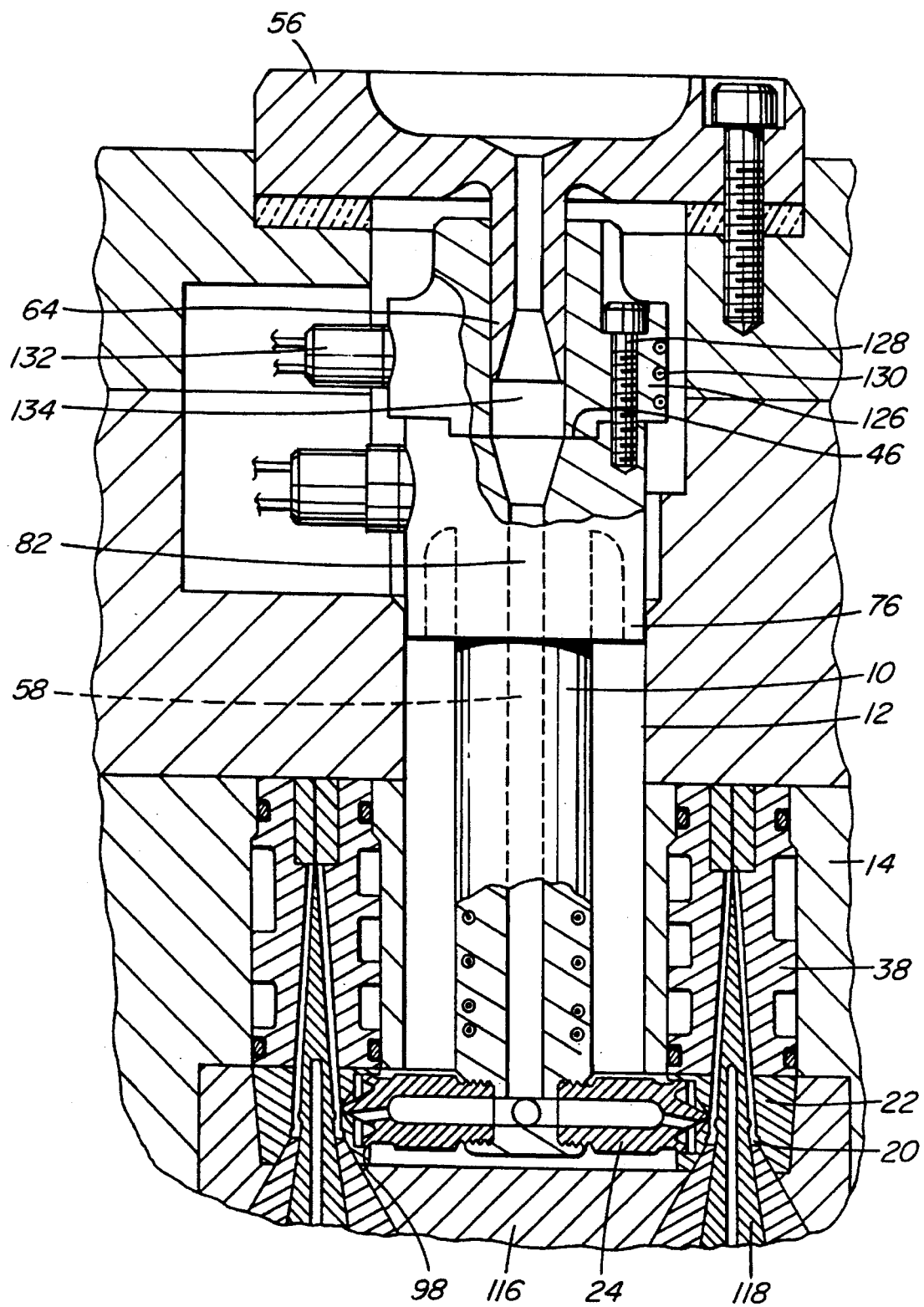
FIG. 4 is a sectional view of a portion of a side gated single-nozzle injection molding system according to another embodiment of the invention.

Reference is now made to FIG. 4 which shows a portion of a side gated injection molding system or apparatus according to another embodiment of the invention in which only a single heated nozzle 10 is seated in a central cylindrical opening 12 in the mold 14. As most of the elements in this embodiment are the same as those of the first embodiment described above, elements common to both embodiments are described and illustrated using the same reference numerals. As can be seen, the locating flange portion 76 of the nozzle 10 and the side gate seals 24 are the same as described above. Thus, lateral and longitudinal location of the nozzle 10 is the same for this single nozzle configuration as for the multi-nozzle configuration. In this case, no melt distribution manifold is required. Instead, a nozzle extension 126 is secured by screws 128 to the rear end 46 of the nozzle 10 to be movable with the nozzle 10 both during installation and to provide for thermal expansion and contraction as described above. The nozzle extension 126 is heated by an integral electrical heating element 130 extending from a terminal 132. The nozzle extension 126 has a central bore 134 which is aligned with the central portion 82 of the melt channel 58 through the nozzle 10. In this embodiment, the central bore 134 receives the sprue stem 64 of the locating ring 56 to provide the slidable connection to convey the melt from the molding machine (not shown) through the fixed locating ring 56 to the movable nozzle extension 126 and nozzle 10. The description of the assembly and use of this embodiment of the invention is essentially the same as that given above and need not be repeated.

While the description of the side gated apparatus in which the nozzle is first located laterally and then located longitudinally by the side gate seals 24 has been given with respect to preferred embodiments, it will be evident that various other modifications are possible without departing from the scope of the invention as understood by those skilled in the art and as defined in the following claims. In particular, the mold 14 can have various configurations to receive other types of side gate seals 24.

The embodiments of the invention in which an exclusive property or privilege is claimed is defined as follows:

1. In a side gated injection molding apparatus having at least one heated nozzle located in a mold, the at least one heated nozzle having a rear end, a front portion with a front end and a generally cylindrical outer surface extending through a central opening in the mold, the central opening in the mold having a generally cylindrical inner surface with an insulative air space provided between the outer surface of the front portion of the at least one heated nozzle with the inner surface of the central opening in the mold, the at least one heated nozzle having a melt channel extending therethrough to convey melt to fill a plurality of cavities spaced in the mold around the central opening, the melt channel having a central portion extending from the rear end of the at least one heated nozzle and a plurality of radial portions branching outwardly from the central portion adjacent the front end of the front portion of the at least one heated nozzle, each radial portion of the melt channel extending in a common plane in alignment with a respective gate extending in the mold to one of the cavities, a plurality of spaced side gate seals, each having an inner end, an outer end, and a bore therebetween, the inner end being seated in the front portion of the at least one heated nozzle with the side gate seal extending radially outwardly across the insulative air space in alignment between a respective radial portion of the melt channel and a respective gate to convey melt outwardly from the melt passage to the gate to fill the cavity, the improvement wherein;

(a) the at least one heated nozzle has a cylindrical locating flange portion which fits in the central opening in the mold to laterally locate the at least one heated nozzle while allowing the at least one nozzle to be advanced to a forward mounting position in which the front portion of the at least one nozzle projects forwardly from the central opening sufficiently to facilitate mounting of the side gate seals in the front portion of the at least one nozzle and then retracted to an assembled position in which the side gate seals are aligned with respective gates in the mold, and each side gate seal has an outer end seated in a matching radial opening in the mold leading to a respective gate, to longitudinally locate the at least one heated nozzle, the outer end of the side gate seal has a cylindrical sealing rim and each radial opening in the mold has an outer cylindrical portion in which the cylindrical sealing rim of a respective side gate seal is seated whereby the side gate seal is located longitudinally in the radial opening while allowing for sufficient lateral movement of the sealing rim in the radial opening to provide for thermal expansion and contraction, whereby the at least one nozzle is located longitudinally at said common plane extending through said gates while allowing for sufficient longitudinal movement of the locating flange portion to provide for thermal expansion and contraction of the at least one nozzle.

2. Injection molding apparatus as claimed in claim 1 having a plurality of heated nozzles extending through separate opening in the mold, the rear end of each heated nozzle secured to a common melt distribution manifold which is movable with the longitudinal movement of the rear ends of the nozzles, the melt distribution manifold having a melt passage which branches from an inlet portion to convey melt to the melt channel extending through each of the heated nozzles, including slidable connection means to convey the melt from fixed melt supply means to the inlet portion of the melt passage in the movable melt distribution manifold.

3. Injection molding apparatus as claimed in claim 1 having a single heated nozzle extending through the central opening in the mold further comprising a nozzle extension secured to the rear end of the heated nozzle to be movable with the longitudinal movement of the rear end of the nozzle, the nozzle extension having a melt passage aligned with the melt channel extending through the nozzle, including slidable connection means to convey melt from fixed melt supply means to the melt passage in the movable nozzle extension.

* * * * *